(12) United States Patent
Long et al.

(10) Patent No.: US 7,180,936 B1
(45) Date of Patent: Feb. 20, 2007

(54) TECHNIQUES TO AVOID G.HS FALSE START DUE TO FEXT

(75) Inventors: Guozhu Long, Newark, CA (US); Syed Abbas, Fremont, CA (US)

(73) Assignee: Centillium Communications, Inc., Fremont, CA (US)

( * ) Notice: Subject to any disclaimer, the term of this patent is extended or adjusted under 35 U.S.C. 154(b) by 1317 days.

(21) Appl. No.: 09/810,422

(22) Filed: Mar. 15, 2001

Related U.S. Application Data

(60) Provisional application No. 60/222,064, filed on Aug. 1, 2000, provisional application No. 60/222,104, filed on Jul. 28, 2000, provisional application No. 60/199,788, filed on Apr. 26, 2000, provisional application No. 60/189,402, filed on Mar. 15, 2000.

(51) Int. Cl.
*H04B 1/38* (2006.01)

(52) U.S. Cl. .................. 375/222; 375/219; 370/201; 379/142.05

(58) Field of Classification Search .............. 375/222, 375/219, 220, 224, 228, 257, 377; 370/201, 370/229, 230; 379/350, 351, 90.01, 93.01, 379/93.17, 93.28, 93.31, 93.32, 93.34, 418, 379/142.01, 142.04, 142.05
See application file for complete search history.

(56) References Cited

U.S. PATENT DOCUMENTS

| | | | |
|---|---|---|---|
| 4,787,045 A * | 11/1988 | Storace et al. .............. 705/403 |
| 6,186,396 B1 * | 2/2001 | Crandall, Jr. ............... 235/379 |
| 6,396,912 B1 * | 5/2002 | Mueller et al. .......... 379/93.32 |
| 6,751,254 B1 * | 6/2004 | Palm .......................... 375/222 |
| 6,765,957 B2 * | 7/2004 | Palm .......................... 375/222 |
| RE38,619 E * | 10/2004 | Paratore et al. ............. 370/347 |
| 6,839,320 B2 * | 1/2005 | Paridaens et al. ........... 370/230 |
| 6,931,451 B1 * | 8/2005 | Logan et al. ............... 709/231 |
| 6,950,459 B1 * | 9/2005 | Palm .......................... 375/222 |
| 2003/0058506 A1 * | 3/2003 | Green et al. ................ 359/172 |
| 2004/0071276 A1 * | 4/2004 | Hickey et al. ........... 379/88.22 |

FOREIGN PATENT DOCUMENTS

EP 0 569 314 A1 * 1/1993

OTHER PUBLICATIONS

Kunii et al., "Tele-hashake Using Handshake Device", Proceedings of the 1995 IEEE IECON 21st Conference on Industrial Electronics, Control, and Instrumentation, vol. 1, Nov. 6-10, 1995, pp. 179-182.*

(Continued)

*Primary Examiner*—Pankaj Kumar
*Assistant Examiner*—Naheed Ejaz
(74) *Attorney, Agent, or Firm*—Fenwick & West LLP

(57) ABSTRACT

A method for preventing false starts during a handshake session involves the use of service identifiers for modem devices. The identifications are provided to one another for subsequent communication. To commence communications, a local device generates a request signal to initiate a handshake session. The request signal includes an identification unique to the remote device. The remote device receives the request and verifies the identification. The remote device then sends a response, which may optionally include an identification unique to the local device. The local device receives the response and verifies the identification before completing the handshake session.

11 Claims, 7 Drawing Sheets

OTHER PUBLICATIONS

Mueller, 3Com Corporation, *G.hs-bis: Defining the C-TONES-BUSY Signal,* International Telecommunication Union, 2 pages, Apr. 2000.

Mueller, 3Com Corporation, *G.hs-bis: Busy Signalling for Solving FEXT Initiation and Multiple RT Issues,* International Telecommunication Union, 6 pages, Apr. 2000.

Brown, Motorola ISG, "Differentiating HSTU-C Initiation from HSTU-C Response," *G.hs-bis: Proposed Annex C for G.hs-bis,* International Telecommunication Union, 4 pages, Apr. 2000.

Brown, Motorola ISG, "Handshake Procedures for Digital Subscriber Line (DSL) Transceivers," *Series G: Transmission Systems and Media, Digital Systems and Networks,* International Telecommunication Union, 101 pages, Apr. 2000.

* cited by examiner

| Bits | | | | | | | | SPar(1)s |
|---|---|---|---|---|---|---|---|---|
| 8 | 7 | 6 | 5 | 4 | 3 | 2 | 1 | |
| x | x | x | x | x | x | X | 1 | Net data rate upstream |
| x | x | x | x | x | x | 1 | x | Net data rate downstream |
| x | x | x | x | x | 1 | X | x | Data flow characteristics upstream |
| x | x | x | x | 1 | x | X | x | Data flow characteristics downstream |
| x | x | x | 1 | x | x | X | x | RT device splitter information |
| x | x | 1 | x | x | x | X | x | CO device splitter information |
| x | 1 | x | x | x | x | X | x | Service identifier information |
| x | 0 | 0 | 0 | 0 | 0 | 0 | 0 | No parameters set in this octet |

Figure 5

| Bits | | | | | | | | Service identifier, Octet 1 - NPar(2)s |
|---|---|---|---|---|---|---|---|---|
| 8 | 7 | 6 | 5 | 4 | 3 | 2 | 1 | |
| x | x | x | x | x | x | X | x | Service identifier, bits 6 to 1 |

FIGURE 6A

| Bits | | | | | | | | Service identifier, Octet 2 - NPar(2)s |
|---|---|---|---|---|---|---|---|---|
| 8 | 7 | 6 | 5 | 4 | 3 | 2 | 1 | |
| x | x | x | x | x | x | X | x | Service identifier, bits 12 to 7 |

FIGURE 6B

| Bits | | | | | | | | Service identifier, Octet 3 - NPar(2)s |
|---|---|---|---|---|---|---|---|---|
| 8 | 7 | 6 | 5 | 4 | 3 | 2 | 1 | |
| x | x | 0 | 0 | x | x | X | x | Service identifier, bits 13 to 16 |

FIGURE 6C

TECHNIQUES TO AVOID G.HS FALSE START DUE TO FEXT

RELATED APPLICATIONS

The present application is related to and claims priority from U.S. Provisional Applications No. 60/189,402 entitled "New Technique to Avoid G.HS False Start Due to FEXT," filed Mar. 15, 2000, No. 60/199,788 entitled "New Technique to Avoid G.HS False Start Due to FEXT," filed Apr. 26, 2000, No. 60/222,104 entitled "G.HS.BIS: Proposed Solutions to Avoid G.HS False Start/Connection Due to FEXT," filed Jul. 28, 2000, and No. 60/222,064 entitled "G.HS.BIS: Proposed Solutions to Avoid G.HS False Start/Connection Due to FEXT (part II)," filed Aug. 1, 2000, all of which are hereby incorporated by reference in their entirety.

FIELD OF THE INVENTION

The present invention relates generally to modem communication and handshaking protocols and, more specifically, to improved connection methods using the G.HS protocol.

BACKGROUND OF THE INVENTION

The Telecommunications Standards Section of the International Telecommunication Union (sometimes designated as ITU-T) provides recommendations to facilitate the standardization of the telecommunications industry. ITU-T recommendation G.994.1 (often referred to as G.HS) defines a handshaking protocol where preliminary information is exchanged between a central office transceiver and a remote transceiver. In general, this handshaking protocol defines the transceivers' capabilities and parameters for the connection between them. Recommendation G.994.1 is herein incorporated by reference in its entirety. The G.HS protocol employs multiple tones in parallel to give resilience in the presence of interference, whereas earlier handshaking techniques used a single tone and were susceptible to external interference. For instance, the single tone could be displaced by interference thereby preventing handshaking from proceeding. Given the robust nature of G.HS, it has been a very popular handshaking protocol and it has been widely implemented.

Field experience has shown, however, that G.HS connections are sometimes affected by cross talk interference. Cross talk is present in data transmission when two wires are close enough to each other that one of them generates energy in the other due to coupling. Two potential types of cross talk coupling are generally referred to as near-end cross talk (NEXT) and far-end cross talk (FEXT). Given the robust nature of the G.HS protocol (despite FEXT being a relatively weak signal), FEXT of G.HS. signals may cause false triggering of connections in adjacent lines. In addition, FEXT of G.HS. signals may cause G.HS connections to be established between different pairs in a cable bundle.

To avoid FEXT false connections, a modification to the G.HS protocol may be used to indicate the busy or idle status of the upstream channel during establishment of a G.HS session. This modified protocol superimposes a busy signal on existing tones from the modem to create busy tones. For reference, the modem may be referred to as a Central Office (CO) modem, the tones as C-TONES, and the busy tones as C-TONES-BUSY. C-TONES-BUSY enables the CO modem to indicate if it is initiating the handshake or if it is responding to a remote terminal (RT) modem that is initiating the handshake.

G.HS allows the RT modem to indicate if it is initiating or responding. If initiating, the RT modem sends a request signal that may be referenced as R-TONES-REQ. If responding, the RT modem sends a response signal that may be referenced as R-TONE1.

In operation, a CO modem initiates a session using C-TONES signals. The RT modem on the primary line responds with R-TONE1. RT modems on adjacent lines may receive the C-TONES signals due to FEXT and respond with R-TONE1. CO modems on adjacent lines are expecting the R-TONES-REQ signal and thus do not communicate. When a RT modem initiates a session, it sends a R-TONES-REQ signal. The CO modem on the primary line responds with C-TONES-BUSY. CO modems on adjacent lines may receive the R-TONES-REQ signal due to FEXT and respond with C-TONES-BUSY as well. RT modems on adjacent lines recognize the C-TONES-BUSY signal as a response and do not communicate.

The modification to the G.HS signaling protocol by the CO and RT modems helps to prevent the inadvertent initiation of G.HS sessions in adjacent wire pairs due to FEXT. The modified signaling protocol further reduces signal collision when multiple G.HS RT modems reside on the same telephone line. This signaling protocol requires that CO modems transmit C-TONES-BUSY in response to R-TONES-REQ. The CO modem does not respond to R-TONE1 unless it just transmitted C-TONES. The RT modem does not respond to C-TONES-BUSY unless it just transmitted R-TONE-REQ.

Although the modified G.HS signaling protocol reduces the likelihood of false starts due to FEXT, it is still problematic. For example, assume that a RT modem initiates and sends R-TONES-REQ and a CO modem responds with C-TONES-BUSY. Due to FEXT, other CO modems may respond with C-TONES-BUSY. Only the initiating RT modem responds with R-TONES1. Other adjacent RT modems will not respond since they receive the C-TONES-BUSY and know that they did not initiate the session. A problem associated with this first scenario is that the RT modem may receive the desired C-TONES-BUSY signal as well as FEXT C-TONES-BUSY signals. If a FEXT C-TONES-BUSY signal comes before the desired C-TONES-BUSY, the initiating RT modem may start communicating with the wrong CO modem. Moreover, this communication may be disrupted by the true and stronger C-TONES-BUSY signal, thereby causing the G.HS handshake to fail. This process may repeat.

Another problem occurs if the true C-TONES-BUSY signal is not received for some reason. This may happen, for example, if the CO modem is disconnected. As a result, a false connection with an adjacent CO may be established due to FEXT. Yet another problem is that the RT modem may continue a handshake with multiple CO modems for a certain time period before terminating the process.

In a second scenario, assume the CO modem initiates a handshake session by sending C-TONES. RT modem responds with R-TONE1. Adjacent RT modems may receive C-TONES due to FEXT and respond with R-TONE1. The CO modem responds to a received R-TONE1 by sending a response signal that may be referred to as C-GALF1. Other adjacent CO modems will not respond since they receive R-TONE1 instead of R-TONES-REQ. A problem associated with this scenario is that the initiating CO modem may receive the desired R-TONE1 signal as well as FEXT R-TONE1 signals. If a FEXT R-TONE1 signal comes before the desired R-TONE1, the CO modem starts communicating with the wrong RT modem. This communication may be disrupted by the true R-TONE1 thereby causing the G.HS session to fail.

Another problem is that the CO modem may not receive the true R-TONE1 for some reason. In such a case, a connection with an adjacent RT may be established through FEXT. Yet another problem is that the CO modem may undergo a handshake session with multiple RT modems for an undue period of time.

Thus, signaling methods with the G.HS protocol are only partially effective in reducing G.HS false connections in adjacent lines. Completion of a desired G.HS handshake session is not guaranteed since such completion may be affected by false responses from a remote end of an adjacent line. Furthermore, if a desired remote end does not respond for some reason, communication through FEXT may commence. There is a need, therefore, for improved methods for reducing false starts due to FEXT.

SUMMARY OF THE INVENTION

The present invention provides systems, methods, and devices that overcome the above-described problems and disadvantages. In one embodiment of the present invention, a local transceiver commences communications with a remote transceiver by generating a request signal to initiate a handshake session. The request signal includes an identification unique to the remote transceiver. The remote transceiver receives the request and verifies the identification. The remote transceiver then sends a response with an identification unique to the local transceiver. The local transceiver receives the response and verifies the identification before completing the handshake session. The present invention prevents false starts due to FEXT by requiring verification of the device receiving signals during the handshake session. Devices on adjacent wires fail to verify the identification and thus will not respond. In this manner, the method ensures that only the desired device will respond.

These and other features and advantages of the present invention will become fully apparent by examination of the following detailed description and the accompanying drawings.

BRIEF DESCRIPTION OF THE DRAWINGS

Non-limiting and non-exhaustive embodiments of the present invention are described in the Figures, in which:

FIG. 5 is a table illustrating code points of an identification field by which a CO or RT device may indicate they support service identification in accordance with one embodiment of the present invention;

FIGS. 6A, B and C are tables illustrating octets of an identification field that specify a service identifier in accordance with one embodiment of the present invention.

DETAILED DESCRIPTION OF THE INVENTION

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" are not necessarily all referring to the same embodiment. Furthermore, the particular features, structures, or characteristics may be combined in any suitable manner in one or more embodiments.

As referenced herein the term device may include a modem or any other communication device capable of performing a handshake session using known protocols (e.g., transceiver). In addition, a CO or RT device may be stated throughout the specification. However, a CO or RT device may also be referenced interchangeably as a local device or a remote device. A local device may be a device that initiates a handshake session and a remote device may be a device that responds to the initiation.

Figure 1:
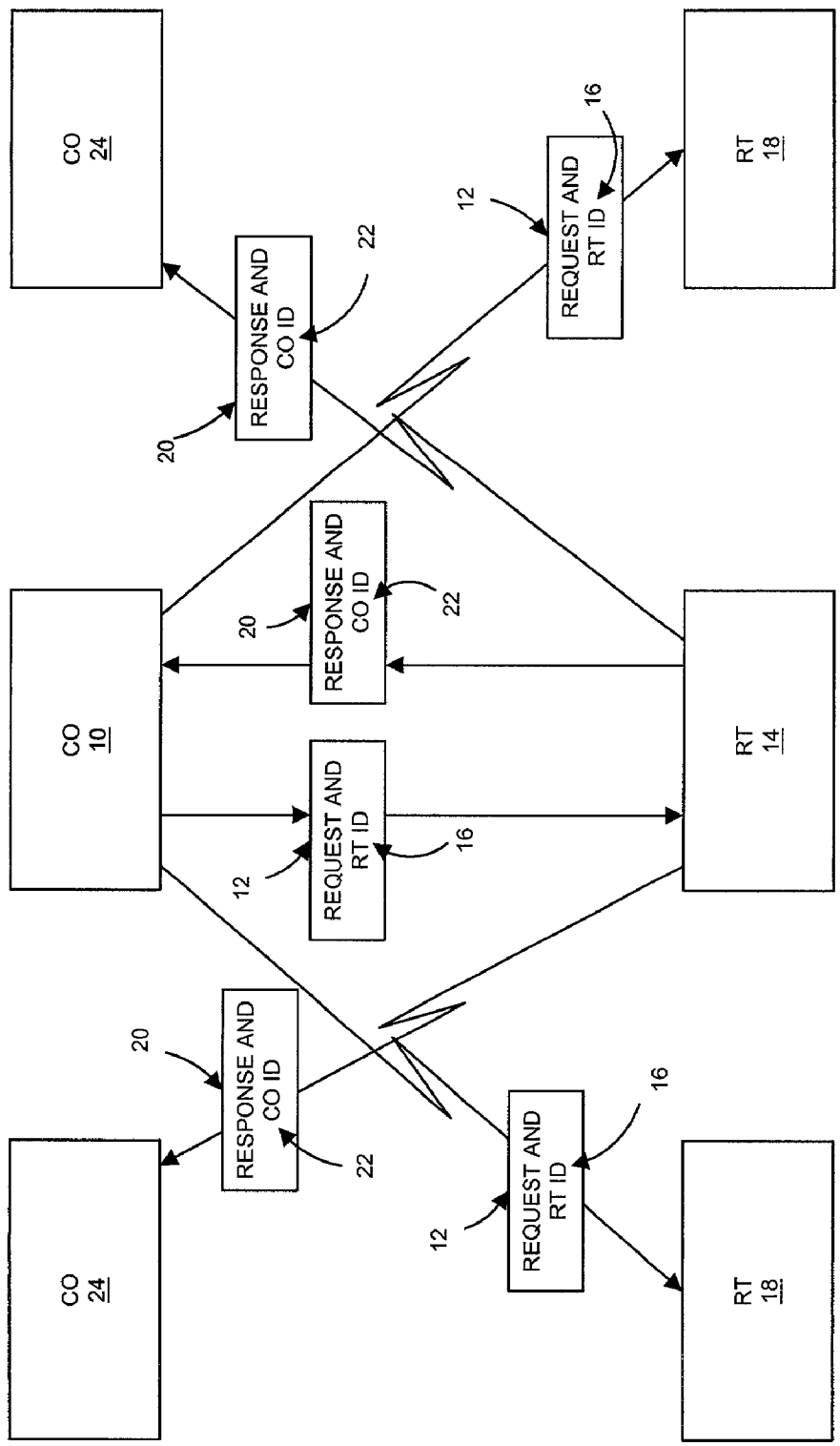
FIG. 1 is a block diagram illustrating a method for performing a handshake session between a central office device and a remote terminal device in accordance with one embodiment of the present invention.

Referring now to FIG. 1, there is shown a block diagram illustrating a method for performing a handshake session between a central office device and a remote terminal device in accordance with one embodiment of the present invention. A central office (CO) device 10 is shown initiating a request 12 with a remote terminal (RT) device 14. In one embodiment, the methods disclosed herein are used in a G.HS protocol environment. However, one of skill in the art will recognize that the techniques disclosed herein may be employed using other protocols as well.

The request 12 includes a RT identification 16 that may be embodied, for example, as an identification signal. The RT identification 16 is unique to the RT device 14. In the G.HS protocol, the request 12 may be identified as C-TONES. The RT device 14 receives the request 12 and verifies that the RT identification 16 is correct before sending a response. Due to FEXT, RT devices 18 on adjacent lines may receive the request 12 and the RT identification 16. The adjacent RT devices 18 verify the RT identification 16. Because the RT identification 16 is not correct, the adjacent RT devices 18 do not respond.

As can be seen, the RT device 14 responds with a response 20. The response 20 may be referred to as R-TONE1 in the case of G.HS protocol. Response 20 may include a CO identification 22 unique to the CO 10. Note, however, that the use of CO identification 22 is not necessary in the case of G.HS protocol. This is because the response 20 (R-TONE1) is different from the RT initiating signal (R-TONE-REQ), which will be discussed in reference to FIGS. 3 and 4. Thus, a response 20 not associated with a CO identification 22 will not false-trigger adjacent CO devices 24 in operating under the G.HS protocol. For the sake of complete discussion, however, this example assumes a CO identification 22 is associated with the response 20.

The CO device 10 receives the response 20 and the CO identification 22. Upon confirmation of the CO identification 22, the CO device 10 continues with the handshake session until completion. CO devices 24 on adjacent lines may also receive the response 20 and the CO identification 22 due to FEXT. The CO devices 24 verify the CO identification 22 and, upon confirming that the CO identification is incorrect, do not respond. In this manner, false starts are avoided by devices 18, 24 on adjacent lines.

Note that in one embodiment, the RT identification 16 and the CO identification 22 are the same and provide a unique identification for the device pair formed by CO device 10 and RT device 14. However, RT identification 16 and CO identification 22 need not be the same so long as they uniquely identify the RT device 14 and the CO device 10, respectively.

Figure 2:
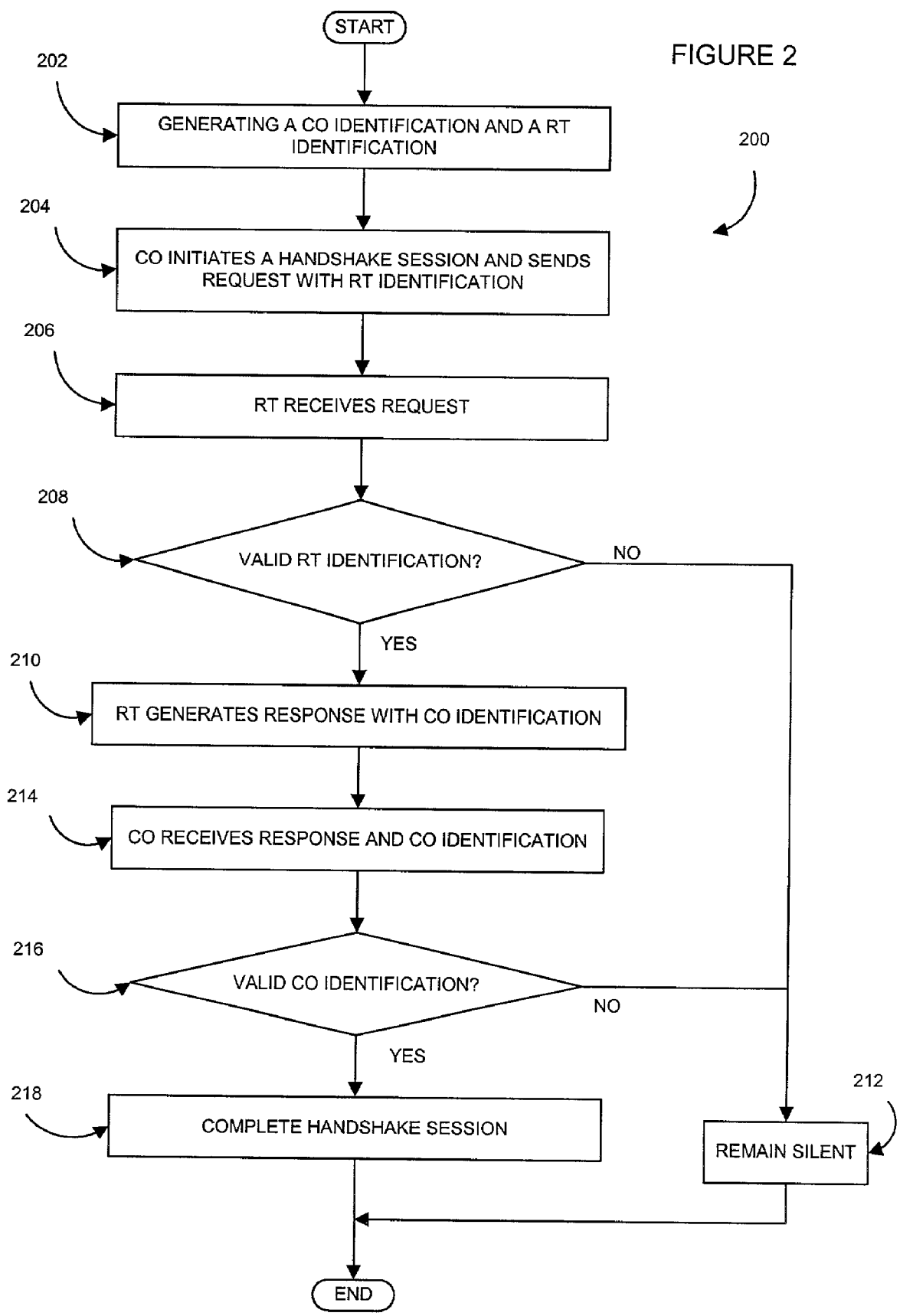
FIG. 2 is a flow diagram illustrating the method of FIG. 1.

FIG. 2 shows a flow diagram 200 illustrating a method for performing a handshake session between a central office device and a remote terminal device in accordance with one embodiment of the present invention. CO and RT identifications 16,22 are generated 202. These identifications 16,22 (also referred to as service identifiers) are unique to the CO and RT devices 10,14. In one embodiment, CO and RT identifications 16 and 22 are the same. Other CO-RT device pairs included in the same cable bundle would each have a unique service identifier as well. The identifications 16,22 may be established during installation of the devices. For example, the service provider for that particular device pair may choose identifications 16,22 and then inform the customer of same during installation, or vice-versa.

In one embodiment, the last 4 digits of the associated POTS number may be used for identifications 16,22 so that they can be readily communicated between the CO and RT devices 10,14. In the case where POTS numbers are not available, identifications 16,22 may be randomly or systematically selected (e.g., by a random number generator or the service provider). Note that multiple service providers may service the same cable bundle. Thus, a relatively large identification space can be used to ensure that adjacent device pairs have different identifications 16,22. For example, the identifications 16,22 can be a six bit binary number so that there are 64 different identifications (e.g., sufficient to support 50 device pairs for a given cable bundle).

The number of bits may be increased to further reduce the likelihood of duplicate identifications for wires in a particular bundle. For example, the identification may be a sixteen bit binary number (or four digit decimal number), so that the chance of adjacent device pairs in the same cable bundle having the same identifier is minimal. Thus, two conditions must be satisfied for a false connection to be established: more than one device pair must be assigned the same identification, and the two device pairs having the same identification must be adjacent. As such, a false connection is very unlikely.

The CO device 10 initiates 204 a handshake session by sending a request 12. This request 12 includes or is otherwise associated with the RT identification 16. The RT device 14 receives 206 the request 12. The RT device 14 then determines 208 if the received RT identification 16 is correct. If the RT identification 16 is not correct (e.g., it does not match the service identifier associated with RT 14), then the RT device 14 remains 212 silent thereby avoiding a false connection. However, if the RT identification 16 is correct (e.g., it matches the service identifier associated with RT 14), then the RT device 14 generates 210 a response 20. The response 20 may include or be otherwise associated with a CO identification 22. Recall, however, that in protocol environments such as G.HS or the like, the CO identification 22 is not necessary as previously explained. Thus, steps related to generation, detection and verification of CO identification 22 may be skipped in such environments.

The CO device 10 receives 214 the response 20 and CO identification 22 from the RT device 14. The CO device 10 then determines whether the CO identification 22 associated with response 20 is correct (e.g., whether it matches the service identifier associated with CO 10). If so, the CO device 10 completes 218 the handshake session with the RT device 14 thereby establishing a valid connection between CO device 10 and RT device 14. However, if the CO identification 22 associated with response 20 is not correct, then the CO device 10 remains 212 silent thereby avoiding a false connection.

Note that adjacent RT devices (e.g., RT device 18) may receive FEXT versions of request 12, but do not respond because the RT identification 16 is not the correct service identifier for those adjacent RT devices. Similarly, note that adjacent CO devices (e.g., CO device 24) may receive FEXT versions of response 20, but do not respond because the CO identification 22 is not the correct service identifier for those adjacent CO devices.

Figure 3:
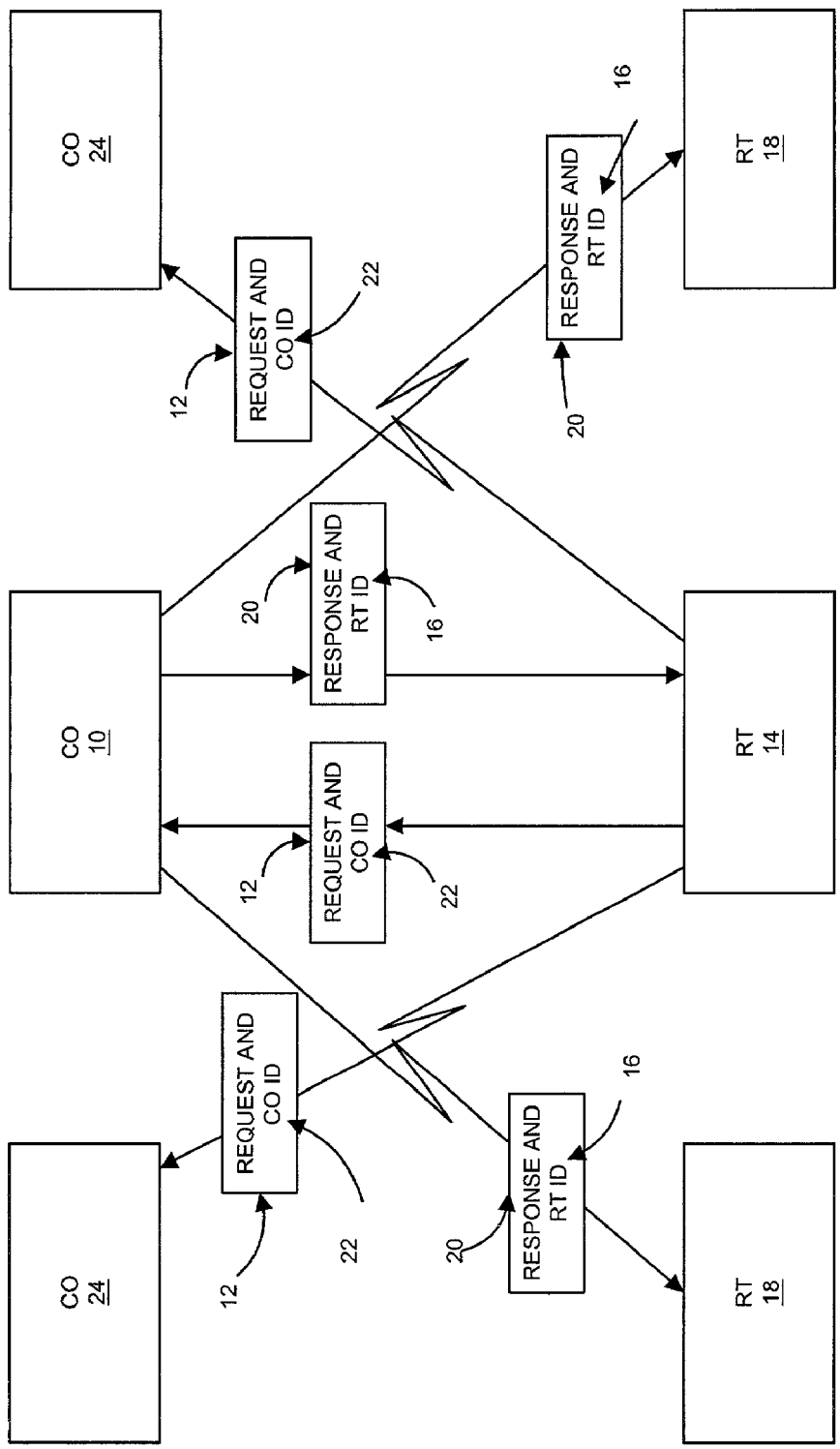
FIG. 3 is a block diagram illustrating a method for performing a handshake session between a remote terminal device and a central office device in accordance with one embodiment of the present invention.
Figure 4:
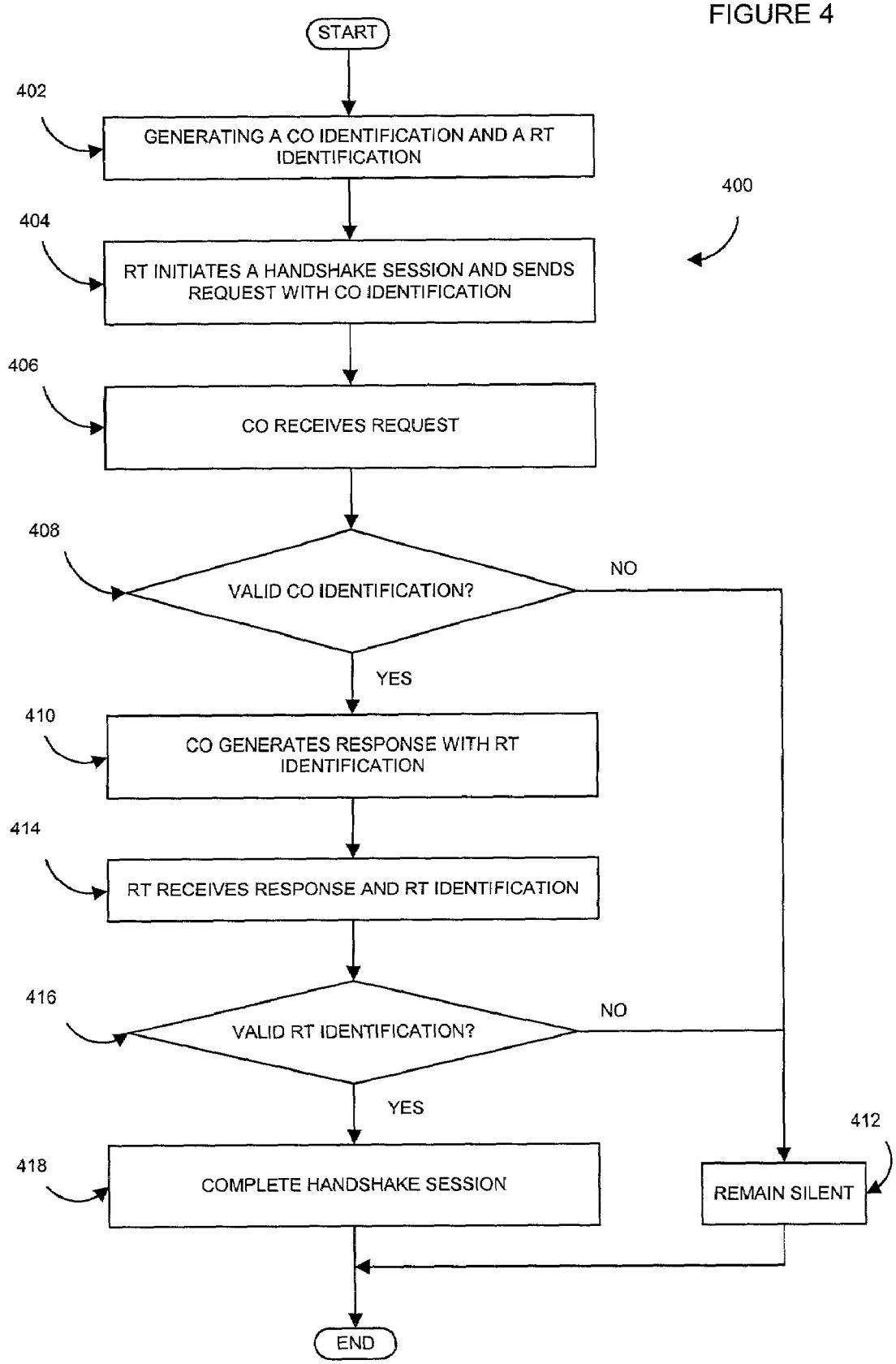
FIG. 4 is a flow diagram illustrating the method of FIG. 3.

Referring to FIGS. 3 and 4, a block diagram and accompanying flow diagram 400 are shown to illustrate a method in accordance with one embodiment of the present invention where the RT device 14 initiates the handshake session. As before, identifications 16, 22 are uniquely generated 402 for the CO device 10 and the RT device 14 pair. The above discussion describing how identifications 16, 22 are established and their various possible forms equally applies here. The RT device 14 initiates 404 the handshake session by sending a request 12. Request 12 may be referred to as a R-TONE-REQ in the case of the G.HS protocol. Request 12 includes or is otherwise associated with the CO identification 22. The CO device 10 receives 406 the request 12 and the CO identification 22.

The CO device 10 determines 408 whether the CO identification 22 is correct (e.g., whether it matches the service identifier associated with CO 10). If the CO identification 22 is not correct, then the CO device 24 remains 412 silent. However, if the CO identification 22 is correct, then the CO device 10 generates 410 a response 20. Response 20 may be referred to as a C-TONES in the case of the G.HS protocol. Response 20 includes or is otherwise associated with the RT identification 16. The RT device 14 receives 414 the response 20 and the RT identification 16.

The RT device 14 determines 416 whether the received RT identification 16 is correct (e.g., whether it matches the service identifier associated with RT 14). If the RT identification 16 is correct, then the RT device 14 completes 418 the handshake session with the CO device 10 thereby establishing a valid connection between RT device 14 and CO device 10. However, if the RT identification 16 is not correct, then the RT device 18 remains 412 silent thereby avoiding a false connection.

Note that adjacent CO devices (e.g., CO device 24) may receive FEXT versions of request 12, but do not respond because the CO identification 22 is not the correct service identifier for those adjacent CO devices. Similarly, note that adjacent RT devices (e.g., RT device 18) may receive FEXT versions of response 20, but do not respond because the RT identification 16 is not the correct service identifier for those adjacent RT devices.

Modulated Service Identifier

The service identifiers (e.g., identifications 16, 22) may be carried or incorporated within the response and request signals 12, 20. This may be accomplished, for example, by modulating the amplitude of the signals 12, 20 to include the service identifiers. Amplitude modulation is advantageous in that it is backward compatible for devices not supporting the techniques of the present invention.

Per the G.HS protocol, R-TONE-REQ (e.g., the RT request 12) has a phase reversal every 16 ms. A particular amplitude level for each 16 ms duration may be used to transmit 1 bit of the corresponding service identifier. For example, six 16 ms periods could be used to transmit a 6 bit service identifier. Likewise, sixteen 16 ms periods could be used to transmit a 16 bit service identifier. A logical ONE bit may be represented by a bigger amplitude A1, and a logical ZERO may be represented by a smaller amplitude A2. Thus, a message specifying the service identifier can be communicated by a RT device using the modulation scheme. Because the service identifier may vary greatly, the average power will also vary. In one embodiment, A1=1 (nominal signal amplitude level) and A2=0.75 (¾ of nominal signal amplitude level). In such an embodiment, note that if the service identifier has more logic ZERO bits, the average power will be slightly lower.

To indicate the beginning of the message including the service identifier, a unique header is added before service identifier. By way of example, the header may consist of a string of bits such as 111111110. Thus, a local device may send a request having the message 11111110xxxxxxxxxxxxxxxx within, where "xxxxxxxxxxxxxxxx" reflects a unique 16 bit service identifier of the associated device or device pair. Likewise, a tail can be added to indicate the end of the message. For example, the tail may consist of 01. Thus, a local device may send a request having the message 11111110xxxxxx01 within, where "xxxxxx" reflects a unique 6 bit service identifier of the associated device or device pair. The R-TONE-REQ (e.g., the RT request 12) is repeatedly sending the message. Since phase reversal is still included, the technique is backwards compatible.

The same modulation scheme can be applied to C-TONES (e.g., CO request 12) to carry the service identifier when the CO device initiates the handshaking session. Thus, no matter which side initiates the handshaking session, only the remote modem on the same line will respond. Phase reversal is not applied to C-TONES and backwards compatibility is therefore not an issue. The identification carried in the request and the response confirms the right connection and prevents false connections due to FEXT. Note that the detection of the service identifier may be made optional, and can be bypassed if so desired. Thus, the present invention provides a backwards compatible solution.

One skilled in the art will recognize alternative methods for incorporating an service identifier within a signal in light of this disclosure, and such alternate methods are intended to be within the scope of this invention. For example, an alternative scheme is to carry the service identifier in signals or tones other than, or in addition to, the R-TONE-REQ and C-TONES signals. In one embodiment, an additional tone can be used to represent a logical ONE, and no additional tone can be used to represent a logical ZERO.

An alternative modulation method is to use differential phase reversal. In such an embodiment, a logical ONE might be represented with phase reversal, while a logical ZERO might be represented without phase reversal. In this way, the average power is always the same. Note, however, that the regular phase reversal in R-TONE-REQ is sometimes non-occurring, although it occurs in most time periods given many logical ONEs in the header and tail of a service identifier message.

Another alternative modulation method is to use frequency modulation. In such an embodiment, a logical ONE might be represented with a first frequency (e.g., nominal −1 KHz), while a logical ZERO is represented with a second frequency (e.g., nominal +1 KHz). Those skilled in the art will recognize other modulation techniques that can be employed in light of this disclosure.

Code Point for Service Identifier

During a G.HS connection session, some message bits are exchanged. In one embodiment, the service identifier can be exchanged as part of a G.HS message to confirm the correct connection, or to exchange the service identification. Referring to FIG. 5, a table is shown that incorporates code points within an Identification Field. The added code points indicate that the device supports the identification methodology of the present invention ("service identifier information"). The message may be exchanged during the handshake protocol at the Spar(1) level of the Identification Field.

Referring to FIGS. 6A–6C, three tables are shown that represent three octets for an Npar(2) level of the Identification Field. As previously stated, a service identifier in accordance with one embodiment of the present invention may be represented by 16 bits. This service identifier may be exchanged during the handshake protocol at the Npar(2) level of the Identification Field using the illustrated three octets as shown. Note that the service identifier may be exchanged at other parameter levels, and may be based on other definitions (e.g., 6 bit). The present invention is not intended to be limited to any one particular embodiment disclosed herein. Other embodiments will be apparent to one skilled in the art in light of this disclosure.

Service Identifier Setup

Figure 7:
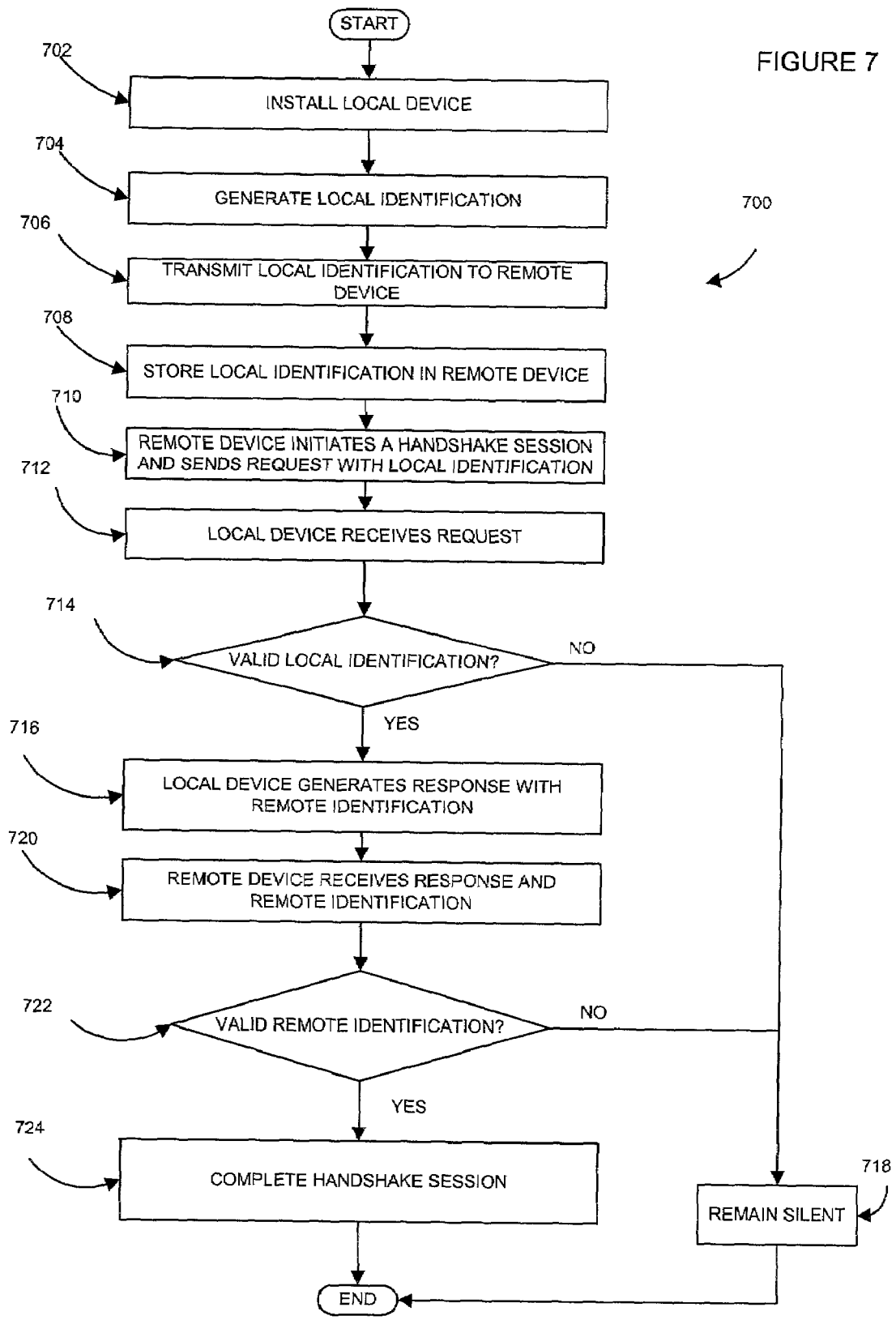
FIG. 7 is a flow diagram illustrating a method for performing a handshake session between a local device and a remote device in accordance with one embodiment of the present invention.

Referring to FIG. 7, a flow diagram 700 illustrating a method for performing a handshake session between a local device and a remote device in accordance with one embodiment of the present invention is shown. In this method, a unique service identifier for a local device is automatically delivered to a remote device after installation. The local device may be an RT or CO device, but for purposes of explanation is selected as an RT device. The remote device is selected as a CO device. Nevertheless, the method is equally applicable to installation of a CO device.

The method commences with the installation 702 of the RT device, or local device. During the installation, the system provider or customer generates 704 an identification number. The identification number may be based on a service mechanism, such as a corresponding POTS number, random selection process (e.g., random number generator), or other identification selection methodology.

Upon an initial communication between the RT device and the CO device, the RT device automatically transmits 706 the identification number to the CO device. This initial communication may be flagged or otherwise identified as a new installation or as a new user transfer. In one embodiment, the RT device transmits the identification number within a carrier signal in code point as defined above with reference to FIGS. 5, 6A, 6B and 6C. The CO device receives and stores 708 the identification number (e.g., in a computer readable memory). The process may continue with either the RT device or the CO device initiating a subsequent handshake session.

The remaining steps 710–724 are as outlined in the flow diagram of FIG. 2 and outline a subsequent handshake session wherein service identifiers are exchanged and verified. Note that the initial communication between a local device and a remote device may be vulnerable to FEXT.

However, the likelihood that other devices on adjacent pairs are undergoing installation at the same time is very small. Labeling the initial communication as a new installation identification transfer or a new user transfer will reduce false starts to an acceptably low probability of occurrence. Devices on adjacent pairs will not be expecting a new user or new installation and will be programmed not to respond.

In summary, the present invention can be used to prevent false starts due to interference (e.g., FEXT) between modems undergoing a handshake session. Identifications are provided to devices on opposing sides to provide verification. Response and request signals include the identifications to ensure that only the correct and desired device responds. Devices on adjacent wires remain silent and do not interfere with the communication.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for performing a G.HS protocol handshake session between a local device and a remote device, the method comprising:
    establishing an identification for the remote device;
    the local device generating a request signal to initiate a handshake session, the request signal including an identification signal representative of the identification;
    the remote device receiving the request signal;
    the remote device verifying the identification signal; and
    the remote device generating a response signal;
    wherein the identification signal is comprised of a number of bits thereby allowing adjacent device pairs in a cable bundle to have unique identifications.

2. A method for performing a G.HS protocol handshake session between a local device and a remote device, the method comprising:
    establishing an identification for the remote device;
    the local device generating a request signal to initiate a handshake session, the request signal including an identification signal representative of the identification;
    configuring the request signal with differential phase reversals to include the identification signal;
    the remote device receiving the request signal;
    the remote device verifying the identification signal; and
    the remote device generating a response signal.

3. A method for performing a G.HS protocol handshake session between a local device and a remote device, the method comprising:
    establishing an identification for the remote device;
    the local device generating a request signal to initiate a handshake session, the request signal including an identification signal representative of the identification;
    configuring the request signal with an additional tone to indicate the identification signal;
    the remote device receiving the request signal;
    the remote device verifying the identification signal; and
    the remote device generating a response signal.

4. A method for performing a handshake session between a local device and a remote device, the method comprising:
    establishing a remote identification corresponding to the remote device;
    establishing a local identification corresponding to the local device;
    the local device generating a request signal to initiate a handshake session, the request signal including a remote identification signal representative of the remote identification;
    the remote device receiving the request signal;
    the remote device verifying the remote identification signal;
    the remote device generating a response signal including a local identification signal representative of the local identification;
    the local device receiving the response signal; and
    the local device verifying the local identification signal;
    wherein the remote and local identification signals are each comprised of a number of bits thereby allowing adjacent local-remote device pairs in a cable bundle to have unique remote and local identifications.

5. A method for performing a handshake session between a local device and a remote device, the method comprising:
    establishing a remote identification corresponding to the remote device;
    establishing a local identification corresponding to the local device;
    the local device generating a request signal to initiate a handshake session, the request signal including a remote identification signal representative of the remote identification;
    the remote device receiving the request signal;
    the remote device verifying the remote identification signal;
    the remote device generating a response signal including a local identification signal representative of the local identification;
    the local device receiving the response signal;
    the local device verifying the local identification signal;
    wherein the request and response signals are configured with differential phase reversals to include the remote and local identification signals.

6. A method for performing a handshake session between a local device and a remote device, the method comprising:
    establishing a remote identification corresponding to the remote device;
    establishing a local identification corresponding to the local device;
    the local device generating a request signal to initiate a handshake session, the request signal including a remote identification signal representative of the remote identification;
    the remote device receiving the request signal;
    the remote device verifying the remote identification signal;
    the remote device generating a response signal including a local identification signal representative of the local identification;
    the local device receiving the response signal;
    the local device verifying the local identification signal;
    wherein the request and response signals include with an additional tone to indicate the remote and local identification signals.

7. A method for performing a handshake session between a local device and a remote device, the method comprising:
   establishing a remote identification corresponding to the remote device;
   establishing a local identification corresponding to the local device;
   the local device generating a request signal to initiate a handshake session, the request signal including a remote identification signal representative of the remote identification;
   the remote device receiving the request signal;
   the remote device verifying the remote identification signal;
   the remote device generating a response signal including a local identification signal representative of the local identification;
   the local device receiving the response signal;
   the local device verifying the local identification signal;
   wherein the local and remote identification signals comprise three octets within an identification field.

8. A method for performing a handshake session between a local device and a remote device, the method comprising:
   establishing a remote identification corresponding to the remote device;
   the remote device transmitting the remote identification to the local device upon an initial communication with the local device after installation of the remote device;
   storing the remote identification for use by the local device in a subsequent communication with the remote device;
   in a subsequent communication, the local device generating a request signal to initiate a handshake session, the request signal including the remote identification;
   the remote device receiving the request signal; and
   the remote device verifying the remote identification signal;
   wherein the remote identification is comprised of a number of bits thereby allowing adjacent device pairs in a cable bundle to have unique identifications.

9. A method for performing a handshake session between a local device and a remote device, the method comprising:
   establishing a remote identification corresponding to the remote device;
   the remote device transmitting the remote identification to the local device upon an initial communication with the local device after installation of the remote device;
   storing the remote identification for use by the local device in a subsequent communication with the remote device;
   in a subsequent communication, the local device generating a request signal to initiate a handshake session, the request signal including the remote identification;
   the remote device receiving the request signal; and
   the remote device verifying the remote identification signal;
   wherein the request signal includes differential phase reversals to include the remote identification.

10. A method for performing a handshake session between a local device and a remote device, the method comprising:
    establishing a remote identification corresponding to the remote device;
    the remote device transmitting the remote identification to the local device upon an initial communication with the local device after installation of the remote device;
    storing the remote identification for use by the local device in a subsequent communication with the remote device;
    in a subsequent communication, the local device generating a request signal to initiate a handshake session, the request signal including the remote identification;
    the remote device receiving the request signal; and
    the remote device verifying the remote identification signal;
    wherein the request signal includes an additional tone to indicate the remote identification.

11. A method for performing a handshake session between a local device and a remote device, the method comprising:
    establishing a remote identification corresponding to the remote device including the step of separating the remote identification into three octets within an identification field;
    the remote device transmitting the remote identification to the local device upon an initial communication with the local device after installation of the remote device;
    storing the remote identification for use by the local device in a subsequent communication with the remote device;
    in a subsequent communication, the local device generating a request signal to initiate a handshake session, the request signal including the remote identification;
    the remote device receiving the request signal; and
    the remote device verifying the remote identification signal.

* * * * *